No. 850,228. PATENTED APR. 16, 1907.
A. JACKSON.
RAKE.
APPLICATION FILED SEPT. 21, 1906.
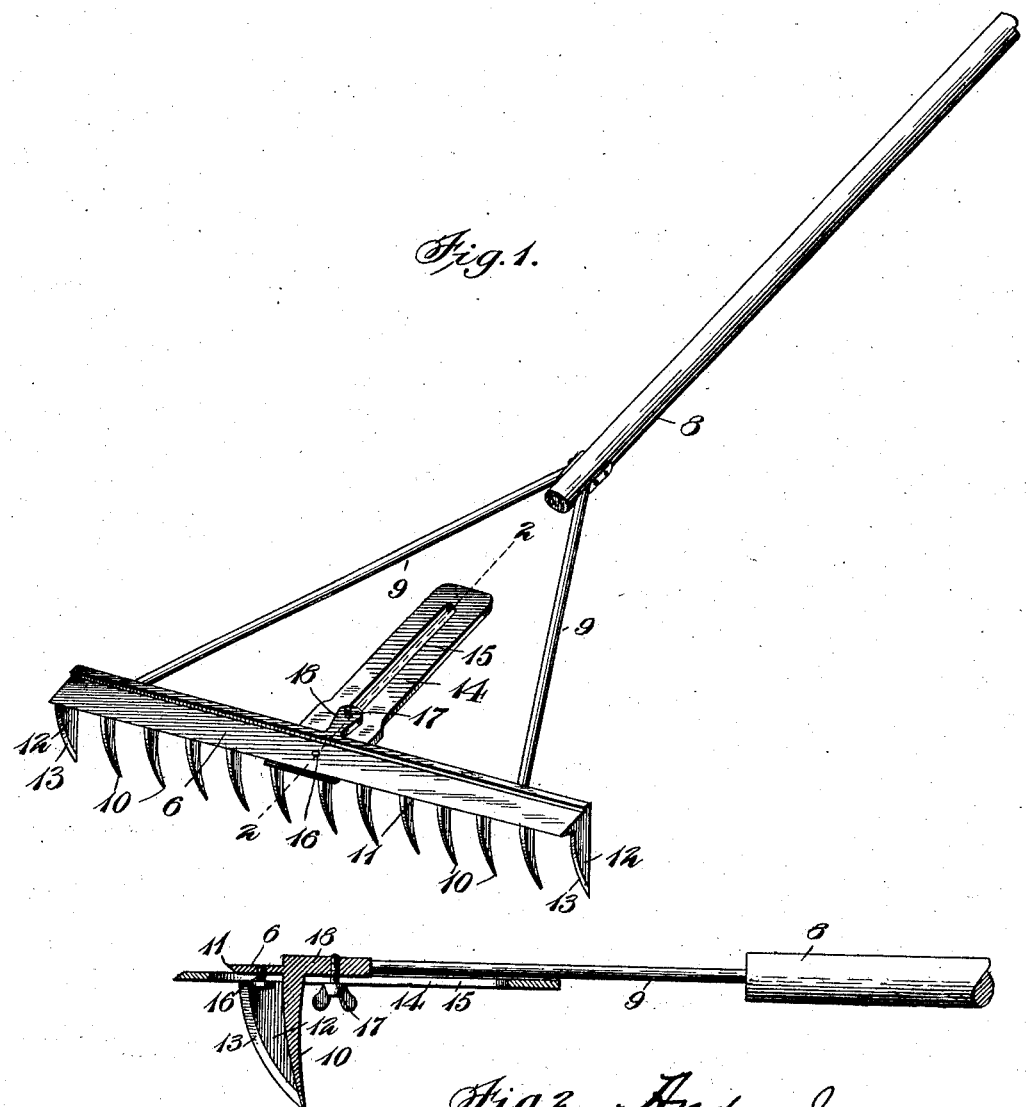

UNITED STATES PATENT OFFICE.

ANDREW JACKSON, OF WINNETKA, ILLINOIS.

RAKE.

No. 850,228.      Specification of Letters Patent.      Patented April 16, 1907.

Application filed September 21, 1906. Serial No. 335,606.

*To all whom it may concern:*

Be it known that I, ANDREW JACKSON, a citizen of the United States, residing at Winnetka, in the county of Cook and State of Illinois, have invented new and useful Improvements in Rakes, of which the following is a specification.

This invention is a combined rake, cutter, and spud adapted for use in gardens and in caring for lawns.

The object of the invention is to form an improved device of the kind in which the rake-head is shaped to form a blade for cutting down weeds and the like and is also provided with an extensible spud which can be projected and used to dig up weeds by the roots or which can be retracted out of position when not in use.

The invention is illustrated in the accompanying drawings, in which—

Figure 1 is a perspective view thereof. Fig. 2 is a section on the line 2 2 of Fig. 1.

The rake-head consists of a bar 6, preferably flat or flattened and connected to the handle 8 by braces 9. Any other mode of attaching the handle may be used. The bar 6 carries the teeth 10 at its front edge, and the rear edge of the bar is beveled to form a cutting blade or edge at 11, producing a weed-cutter by reversing the implement. The two end teeth have a thin rearwardly-extending web 12, formed integral therewith and sharpened at the rear edge, as at 13, to match with the cutting edge 11 of the head. The end cutters thus form blades which are useful in trimming the edges of walks and the like.

The spud consists of a long narrow blade 14, which is slotted lengthwise, as at 15, and this is secured to the under side of the rake-head 6 by means of a headed stud 16 and a thumb-screw 17, which project through the slot 15. The screw 17 screws into a forwardly-projecting lug 18 on the front edge of the head 6. The spud is sharpened at its outer end and is slidable in and out to retract or project the same and may be fixed in either position by means of the thumb-screw. When extended, it projects beyond the rake-head, so that it can be driven into the ground beside a weed to uproot the same. When it is desired to use the rake or the cutting-blade, the spud is retracted, as shown in Fig. 1.

The device is intended to provide three useful implements adapted for lawn and garden work and for trimming walks, flower-beds, and the like.

I claim—

1. A rake having an outwardly-extending blade formed on the head thereof and corresponding side blades formed on the end teeth and joined to the ends of the aforesaid blade.

2. A rake having a spud attachment comprising a blade attached to the rake-head and movable in and out therein, and means to hold the blade in either position.

3. A rake having a projecting lug and thumb-screw on the head thereof, and a blade movable in and out on the head and having a slot through which the lug and thumb-screw extend.

In testimony whereof I have signed my name to this specification in the presence of two subscribing witnesses.

ANDREW JACKSON.

Witnesses:
    NELLIE FELTSKOG,
    H. G. BATCHELOR.